(No Model.)
W. W. TUCKER.
BALL BEARING FOR CYCLES OR VELOCIPEDES.
No. 601,821. Patented Apr. 5, 1898.
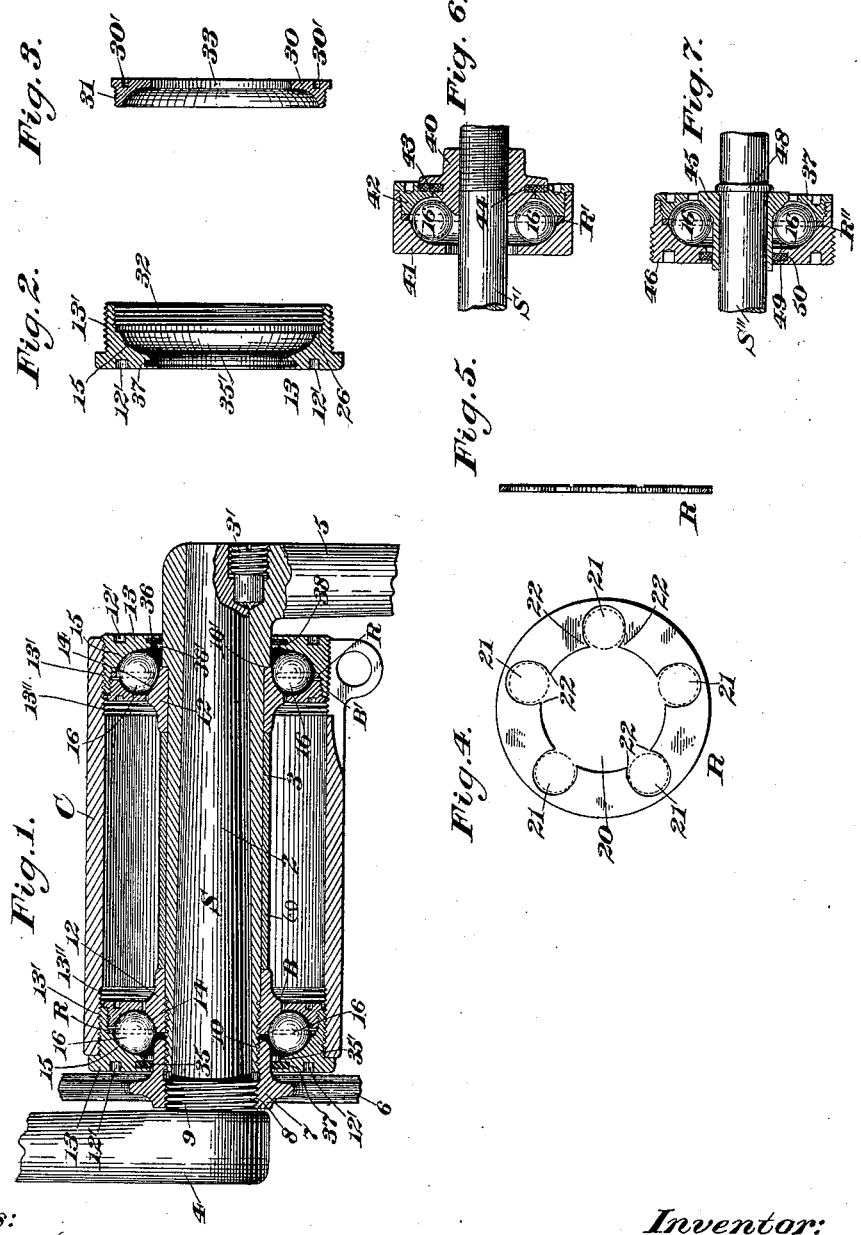
Witnesses:
Chas. D. King
J. L. Edwards Jr.
Inventor:
William W. Tucker.
By his Attorney,
F. A. Richards

UNITED STATES PATENT OFFICE.

WILLIAM W. TUCKER, OF HARTFORD, CONNECTICUT.

BALL-BEARING FOR CYCLES OR VELOCIPEDES.

SPECIFICATION forming part of Letters Patent No. 601,821, dated April 5, 1898.

Application filed June 28, 1897. Serial No. 642,557. (No model.)

*To all whom it may concern:*

Be it known that I, WILLIAM W. TUCKER, a citizen of the United States, residing in Hartford, in the county of Hartford and State of Connecticut, have invented certain new and useful Improvements in Ball-Bearings for Cycles or Velocipedes, of which the following is a specification.

This invention relates to the bearings of cycles or velocipedes, and it comprehends the provision of means for preventing the rubbing action of the balls against each other, but which permits them to roll freely in contact with their bearing-surfaces, whereby the life of the balls is materially prolonged without affecting the easy-running nature of the bearing, the several parts of which are capable of being rapidly assembled and disassembled.

In the drawings accompanying and forming part of this specification, Figure 1 is a longitudinal sectional view of a bicycle-hub and adjacent parts embodying my present improvements. Fig. 2 is a central sectional view of a portion of a bearing. Fig. 3 is a similar view of a holding device for a ball-retainer. Fig. 4 is a view in elevation of the ball-retainer. Fig. 5 is a central section of the same, and Figs. 6 and 7 are central sectional views of modified forms of bearings.

Similar characters designate like parts in all the figures of the drawings.

My present invention comprehends, essentially, a shaft or equivalent device, a bearing surrounding the same and consisting of two sections having bearing-surfaces or raceways, a series of balls adapted to roll against said surfaces, and a ball-retainer fitted in one of the sections of the bearing and constructed to hold the balls away from each other.

For the purpose of indicating the nature of my present invention it is represented in conjunction with a common form of bicycle-hub embodying a cylindrical barrel or casing C, to be secured in the usual manner in a similarly-shaped opening in the framework (not shown) of a cycle, said casing or barrel encircling the crank shaft or axis S.

The crank-shaft S in the form represented consists of two parts 2 and 3, the part 3 being tubular and sleeved on and secured to the part 2 by a screw 3'. The usual cranks or pedal-carriers are designated by 4 and 5, they being generally formed in one piece with the shaft-sections 2 and 3, respectively. A fragment of the ordinary sprocket-wheel is shown at 6, having an internally-threaded hub 7, the threads 8 of which engage correspondingly-formed external threads 9 and 10, respectively, on the shaft-sections 2 and 3.

The two bearings are designated, respectively, by B and B', each surrounding the shaft S at opposite ends thereof and each consisting of two sections 12 and 13. The sections 12 and 13 of the two bearings are secured, respectively, to the shaft S and casing C, and they are provided, as shown in Fig. 1, with concave bearing-surfaces or raceways 14 and 15, against which a series of balls, as 16, is adapted to roll on the rotation of the shaft S. The cones or parts 12 of the two bearings B and B' are secured in some convenient manner near the opposite ends of the external portion 3 of the shaft for rotation with said shaft, the sections or rings 13 being fixed or stationary in the casing C and preferably furnished with external threads 13', which engage corresponding internal threads 13" at the opposite ends of the casing C. The parts 13 of the bearings also have recesses 12' to receive the usual spanner-wrench, by which said parts can be turned into and out of their seats.

The ball-retainers are designated by R, and each consists of a plate or disk which can be readily stamped from sheet metal. Each retainer R has an enlarged central aperture 20, through which the shaft S may pass, and a series of recesses or sockets 21, extending from the wall of the aperture in which the balls are disposed, said retainers having abutments or shoulders 22 adjacent to each recess to prevent the several balls from dropping out when either bearing is taken apart.

The recesses or sockets 21 are substantially elliptical in shape, and the minor axis of each slightly exceeds the diameter of the ball, the latter being illustrated by dotted lines in Fig. 4, so that each ball may roll freely in its respective recess or socket on the rotation of the shaft S, but will by the shape of the socket be prevented from dropping out therefrom.

It will be apparent that by reason of the shape of the recesses or sockets 21 the several balls may slightly move toward and from the axis of rotation of the shaft, so that should the bearing-sections 13 be run farther into their seats to take up wear the balls will still be maintained in contact with the bearing-surfaces 15.

The retainers or plates R are loosely fitted in annular seats 20', formed in the outer sections or rings 13 of the two bearings, and they abut against stops or shoulders, as 26, in said sections. The two retainers or plates being loosely fitted in their seats, as just stated, can readily rotate with the shaft S to obtain the usual advantages possessed by bearings of this nature. Said retainers are maintained against displacement by any suitable means, such as the holding rings or caps 30, with external threads 31, engaging the internal threads 32 on the bearing-section 13 and having openings 33, through which the shaft S can extend. The two rings also have the ordinary recesses 30' to receive a spanner to provide for their insertion in and removal from place. These rings also serve as convenient devices for preventing the balls rolling sidewise or laterally from their pockets or seats in the retainers when the bearing members 13 are removed from the casing C, which advantage, as is apparent, is an important one.

To prevent the admission of dust and other foreign matter into the two bearings B and B' through the openings 35' and 36' in the two bearing-rings 13, a guard of suitable nature will be provided for each bearing, such guards being designated by 35 and 36 and each consisting of a ring of felt or other suitable material adapted to cover said openings, the two guards being preferably seated in the annular channels or grooves 37 and 38 in the bearing-rings, as shown in Fig. 1.

The order of assemblage of the various members of the bearing illustrated in Fig. 1, the casing or bearing C having been previously secured in the framing, is as follows: The retainer R of the bearing B' will be fitted on its seat 26 on the bearing-section 13, the balls 16 then being placed in the several sockets 21, after which the retainer-holding ring or cap 30 is screwed in the bearing-section 13 until it nearly abuts against the retainer, after which the bearing as thus partly assembled is placed over the shaft-section 3 and the latter passed through the casing C from the right, the bearing-section 13 being turned into the casing C by a suitable tool. The bearing-section or cone 12 is then slipped along the shaft-section 3 until it abuts against the stop-shoulder 16', so that the balls 16 can work against the two bearing-surfaces 14 and 15. The longitudinal spacing-collar 60 will then be placed over the shaft S until it strikes the section 12 of the bearing B'. The bearing B' will then be similarly assembled, after which the sprocket-wheel 6 will be secured to the inner section of the shaft and said section 2 inserted in the tubular section 3, the hub of the sprocket-wheel being also turned on the tubular section of said shaft. When the two parts of the shaft are in proper position, they will be secured by the screw 3'.

It will be apparent that the bearing-section 13, with the ring 30, can be removed from the shaft without necessitating the withdrawal of the bearing-section 12. Should it be desired to remove the balls from their sockets 21, it is simply necessary to unscrew the cap or ring, when the object desired can be accomplished without any danger of the balls dropping from their sockets, they being positively held against such action by the shoulders or abutments 22. It will be obvious also that any one of the balls of the series can be easily removed without disturbing any of the others.

In Fig. 6 I have shown a modified form of bearing, the cone 40 thereof being in threaded engagement with the shaft S' and the section 41 of said bearing having its periphery plain, so that it can be driven into the casing of the hub. The retainer R' is similar in construction and mounting to the retainer shown in Figs. 1, 4, and 5, as is the holding ring or cap 42 for said retainer. The dust-guard 43 around the shaft is seated in a channel 44 in the cone 40.

In Fig. 7 another slightly-modified form of the bearing is shown, the respective sections of the bearing being designated by 45 and 46, the retainer R" and its holding-ring 37 being similar to those shown in the other views. The cone 45 is in the form of a longitudinal thimble abutting against the annular shoulder 48 on the shaft S". In Fig. 7 the bearing-section is furnished with the dust-guard 49, seated in the annular groove 50 in said section.

Having described my invention, I claim—

1. A ball-bearing member consisting of an externally-threaded section having a raceway and an internal thread adjacent to said raceway; a ball-retainer seated in said section and provided with a series of recesses to receive and retain the balls; and an externally-threaded cap fitted within the first-named section and serving to secure the ball-retainer in position.

2. The combination of a shaft; a casing surrounding said shaft; a bearing consisting of two sections secured, respectively, to the shaft and casing and having bearing-surfaces, the bearing-section carried by the casing having an annular seat; a disk loosely fitted in said seat and having a central aperture to receive the shaft and also having a series of substantially elliptical sockets extending from the wall of the aperture; and a series of balls disposed in said sockets.

3. A retainer for bearing-balls, consisting of a plate having an aperture and a series of substantially elliptical recesses communicating with the aperture.

WILLIAM W. TUCKER.

Witnesses:
EMORY C. WHITNEY,
WM. H. BLODGETT.